US009420617B2

(12) United States Patent
Kalhan

(10) Patent No.: US 9,420,617 B2
(45) Date of Patent: Aug. 16, 2016

(54) MANAGEMENT OF DEVICE-TO-DEVICE COMMUNICATION RESOURCES USING MACROCELL COMMUNICATION RESOURCES

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/399,436

(22) PCT Filed: May 10, 2013

(86) PCT No.: PCT/US2013/040584
§ 371 (c)(1),
(2) Date: Nov. 6, 2014

(87) PCT Pub. No.: WO2013/170175
PCT Pub. Date: Nov. 14, 2013

(65) Prior Publication Data
US 2015/0111587 A1 Apr. 23, 2015

Related U.S. Application Data

(60) Provisional application No. 61/645,932, filed on May 11, 2012.

(51) Int. Cl.
*H04W 76/02* (2009.01)
*H04W 72/04* (2009.01)
(52) U.S. Cl.
CPC ............ *H04W 76/023* (2013.01); *H04W 72/04* (2013.01)
(58) Field of Classification Search
CPC ............................ H04W 76/023; H04W 72/04
See application file for complete search history.

(56) References Cited

U.S. PATENT DOCUMENTS

| 8,432,786 | B2 | 4/2013 | Li et al. | |
|---|---|---|---|---|
| 2009/0110038 | A1 | 4/2009 | Montojo et al. | |
| 2009/0238289 | A1 | 9/2009 | Sampath et al. | |
| 2012/0106517 | A1* | 5/2012 | Charbit | H04W 72/04 370/336 |
| 2013/0005377 | A1* | 1/2013 | Wang | H04W 72/0406 455/509 |
| 2014/0064203 | A1* | 3/2014 | Seo | H04W 28/06 370/329 |

FOREIGN PATENT DOCUMENTS

| JP | 05-145471 | 6/1993 |
|---|---|---|
| JP | H11-122159 | 4/1999 |
| JP | 2002-159050 | 5/2002 |

(Continued)

*Primary Examiner* — Chuong A Ngo

(57) ABSTRACT

Macrocell communication resources 121 are used to exchange signals between a base station 102 and at least one wireless communication device 104, 106 to establish a device-to-device (D2D) communication link 122 between a first wireless communication device 104 and a second wireless communication device 106. A call, or other communication session, may be initiated by the first wireless communication device by sending a D2D call initiation message over uplink macrocell communication resources to the core network of a cellular communication system. The first wireless communication device may also transmit D2D link information regarding the wireless D2D communication link between the wireless communication devices. The core network sends D2D link establishment information over macrocell downlink communication resources to at least one of the wireless communication devices where the link establishment information allows the wireless communication devices to establish and communication over the D2D communication link.

18 Claims, 5 Drawing Sheets

(56) References Cited

FOREIGN PATENT DOCUMENTS

| | | |
|---|---|---|
| JP | 2009-017560 | 1/2009 |
| WO | WO 2010/082084 | 7/2010 |
| WO | WO 2010/082114 | 7/2010 |
| WO | WO 2011/109941 | 9/2011 |
| WO | WO 2011/130630 | 10/2011 |
| WO | WO 2013/074462 | 5/2013 |
| WO | WO 2013/074463 | 5/2013 |

* cited by examiner

MANAGEMENT OF DEVICE-TO-DEVICE COMMUNICATION RESOURCES USING MACROCELL COMMUNICATION RESOURCES

FIELD

This invention generally relates to wireless communications and more particularly to management of device-to-device (D2D) communication resources using macrocell communication resources.

BACKGROUND

Many wireless communication systems use base stations to provide geographical service areas where wireless communication user equipment (UE) devices communicate with the base station providing the particular geographical service area in which the wireless communication UE devices are located. The base stations are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

Macrocell communication resources are used to exchange signals between a base station and at least one wireless communication device to establish a device-to-device (D2D) communication link between a first wireless communication device and a second wireless communication device. A call, or other communication session, may be initiated by the first wireless communication device by sending a D2D call initiation message over uplink macrocell communication resources to the core network of a cellular communication system. The first wireless communication device may also transmit D2D link information regarding the wireless D2D communication link between the wireless communication devices. The core network sends D2D link establishment information over macrocell downlink communication resources to at least one of the wireless communication devices where the link establishment information allows the wireless communication devices to establish and communicate over the D2D communication link.

DETAILED DESCRIPTION

Figure 1A:
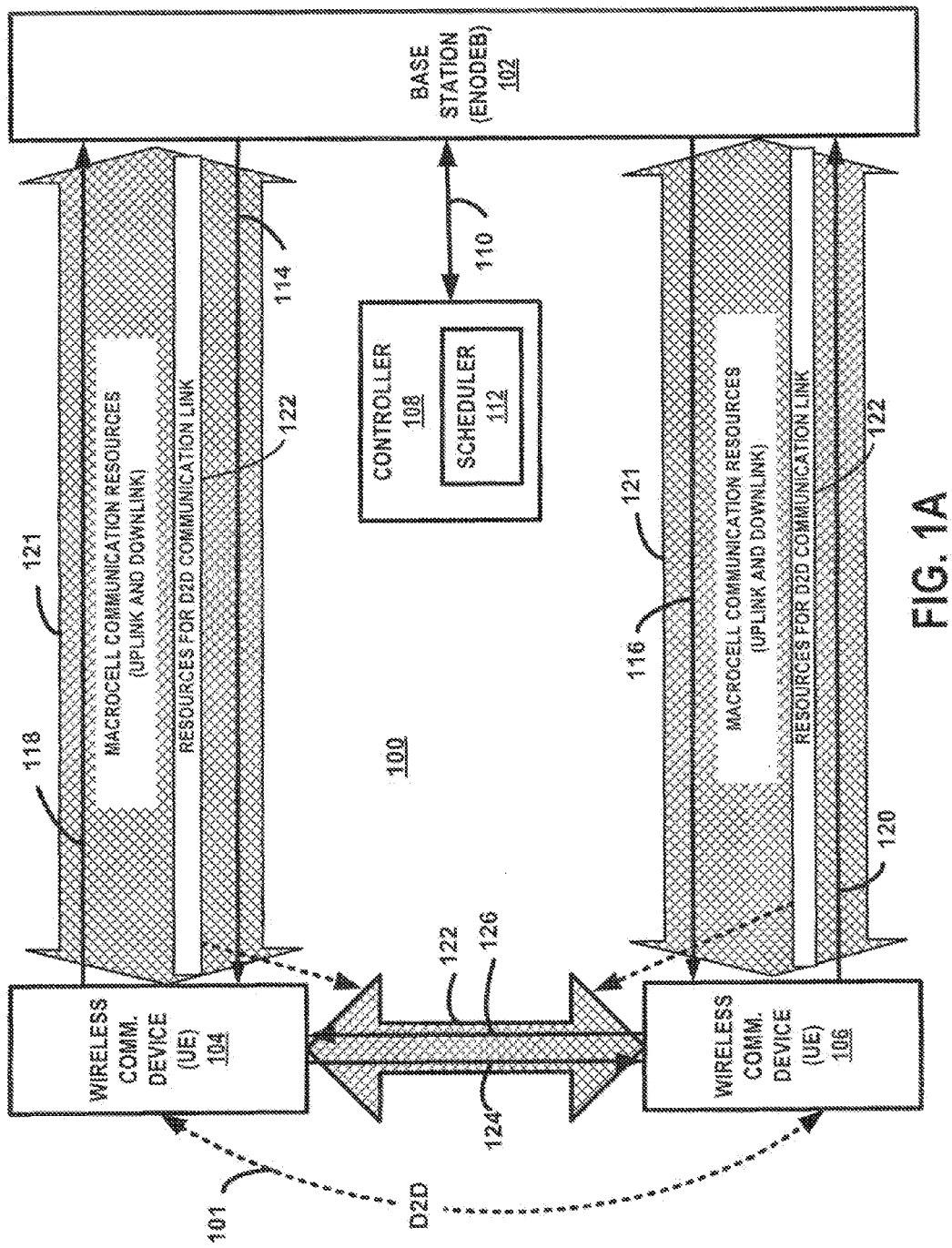
FIG. 1A is a block diagram of an example of a communication system where macrocell communication resources are used to establish a device-to-device (D2D) communication link between wireless communication devices.

A communication system utilizes macrocell communication resources for communication between base stations (eNodeBs, eNBs) and wireless communication user equipment devices (UEs). The macrocell communication resources include downlink communication resources for downlink communication from a base station to wireless communication user equipment (UE) devices and uplink communication resources for uplink transmissions from the UE devices to the base station. The uplink communication resources are different from the downlink communication resources. Some of the macrocell communication resources are assigned to device-to-device (D2D) communication between two UE devices as needed. The downlink communication resources assigned for D2D communication are not used for downlink communication. For example, if the communication resources are time-frequency communication resources, the time segments and frequency bands (e.g., sub-carriers) assigned to the D2D communication link are not used by the base station. If uplink communication resources are assigned for D2D communication, the resources are assigned such that interference to other D2D communication and to uplink communication in adjacent cells, as well as the same cell, is minimized. Examples of suitable techniques for managing macrocell resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

In the examples discussed herein, a base station uses macrocell communication resources to exchange information with wireless communication devices to establish a device-to-device (D2D) communication link between a first wireless communication device and a second wireless communication device. The macrocell communication resources are defined by a communication specification for communication between wireless communication devices (UEs) and base stations (eNBs).

The first wireless communication device sends a D2D call initiation message to a base station to initiate a D2D communication link, where the D2D call initiation message requests to establish D2D communications with a second wireless communication device. The message may identify the second wireless communication device with a device identifier such as a telephone number or other unique value or string. The base station pages the second wireless communication device. After receiving an acknowledgment from the second wireless communication device, the base station sends a response to the first wireless communication device. The first wireless communication device responds with D2D link information that may include parameters such as a Buffer Status Report (BSR), Power Headroom Report (PHR), and Channel State Information (CSI) related to the D2D communication link between the first wireless communication device and the second wireless communication device. The base station assigns (schedules) communication resources for the D2D communication link and sends link establishment messages identifying the resources to the wireless communication devices to inform the devices of the assigned D2D resources. Although the base station may also receive D2D link information from the first wireless communication device in some circumstances, one alternative includes relying on reciprocity of the communication channel characteristics and using D2D link information received from the first wireless communication device to schedule D2D communication resources for transmission from the second wireless communication device. For the examples described herein, the D2D signaling between the base station (eNB) and the wireless communication device (UE) does not impact the macrocell signaling for conventional macrocell communications. Accordingly, wireless communication devices are capable of simultaneously maintaining D2D and macrocell communication links.

Figure 1B:
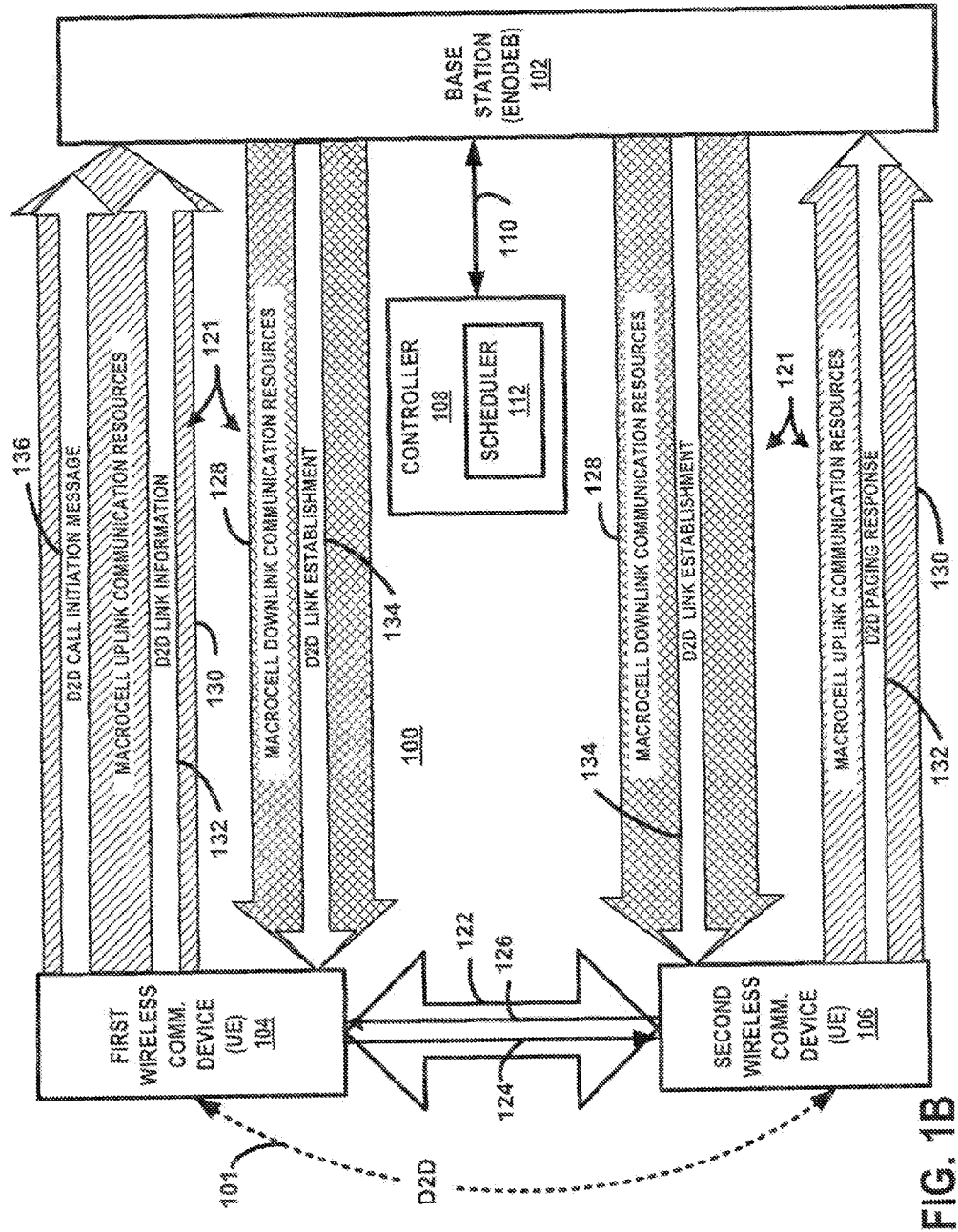
FIG. 1B is a block diagram of an example of the resources used in the communication system of FIG. 1A to establish the D2D communication link.

FIG. 1A and FIG. 1B are block diagrams of an example of a communication system 100 where macrocell communication resources are used for communication with wireless communication devices to establish a device-to-device (D2D) communication link 101 between wireless communication devices. A relationship between macrocell communication resources and the D2D communication link is shown in FIG. 1A. In FIG. 1B, the resources for establishing the D2D communication link are shown. A base station 102 provides wireless communication services to wireless communication user equipment (UE) devices 104, 106 within a geographical service area, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device, and the functions described as performed in any single device may be implemented over several devices. For example, at least some of the functions of the controller 108 may be performed by the wireless communication devices 104, 106 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, sometimes referred to as an eNodeB or eNB, which may include a controller in some circumstances. The base station 102 is connected to a controller 108 through a backhaul 110 which may include any combination of wired, optical, and/or wireless communication channels. For the examples herein, the controller 108 includes the functionality of the Mobility Management Entity (MME) and the Packet Gateway (P-GW) in a 3GPP LTE communication system. Accordingly, the controller 108 includes a scheduler 112. In the example, the scheduler 112 allocates time-frequency resources for D2D communication between the wireless communication devices 104, 106 and for macrocell communication between the base station 102 and the wireless communication devices 104, 106.

The wireless (UE) communication devices 104, 106 may be referred to as mobile devices, wireless devices, wireless communication devices, and mobile wireless devices, UEs, UE devices as well as by other terms. The wireless communication UE devices 104, 106 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, or television.

The base station 102 includes a wireless transceiver that exchanges wireless signals 114, 116, 118, 120 with the wireless communication devices 104, 106. Transmissions from the base stations and from the wireless communication devices 104, 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 121 are used for transmitting the downlink signals 114, 116 and the uplink signals 118, 120. The base station 102 transmits downlink signals 114, 116 to the wireless communication devices 104, 106 using scheduled downlink communication resources of the defined downlink communication resources defined by the communication specification and reserved for downlink communication. The wireless communication devices transmit uplink signals 118, 120 to the base station using scheduled uplink communication resources of the defined uplink communication resources defined by the communication specification and reserved for uplink communication. The macrocell communication resources 121 include frequency bands divided in time where each frequency band and segment of time can be identified by the scheduler 112 and described in control signals sent from the base station 102 to the wireless communication devices 104, 106. The communication specifications, or other system rules, therefore, define applicable communication resources for the downlink and applicable communication resources for the uplink. The scheduler 112 allocates different time-frequency resources to different devices to efficiently utilize the resources while minimizing interference. Accordingly, the scheduled macrocell communication resources used for signals 114, 118 exchanged with one wireless communication device 104 are different from scheduled macrocell communication resources used for other signals 116, 120 exchanged with other wireless communication devices 106. As referred to herein, therefore, the macrocell communication resources 121 are the communication resources reserved for communication by the specification and/or communication system rules. The scheduled resources for transmission for particular signals, however, are a subset of the reserved macrocell communication resources 121.

Some of the defined macrocell communication resources are assigned (scheduled) for D2D communication. This portion (122) of defined macrocell communication resources 121, referred to as D2D communication resources 122, is typically scheduled dynamically as needed and based on channel conditions as well as other criteria. The scheduler 112, therefore, may assign either defined macrocell downlink communication resources, defined macrocell uplink communication resources, or both for D2D communication.

In certain situations, it may be desirable for the wireless communication device to communicate directly over a D2D communication link instead of through base stations. During D2D communication, the first wireless communication device 104 transmits first D2D signals 124 to the second wireless communication device 106, and the second wireless communication device 106 transmits second D2D signals 126 to the first wireless communication device 104. In some situations, the D2D transmission may only be in one direction. For example, a D2D link may be established from a laptop to a display where only the laptop transmits signals to the display for broadcasting, streaming and other purposes.

For efficient D2D communications, the wireless communication devices typically must be close to each other. Since many wireless communication devices are mobile, the distance between any two devices changes. As a result, either the network or one of the wireless communication devices must determine that the wireless communication devices are sufficiently close for D2D communication. In the examples herein, a wireless communication device detects another nearby wireless communication device by receiving a reference signal transmitted by the other wireless communication device. After detection, the wireless communication device may attempt to initiate a D2D communication link 101 as discussed in further detail below.

The scheduler 112 allocates time-frequency resources for communication between the base station 102 and the wireless communication devices 104, 106. In addition, the controller 108, scheduler 112, and/or the base station 102 schedules sounding reference signals (SRS) on the uplink. In the examples discussed herein, the scheduler 112 also allocates (schedules) time-frequency resources for transmission of D2D SRS from the wireless communication UE devices 104, 106 to establish and/or maintain the device-to-device (D2D) communication link 101. The D2D SRS transmissions are used for device detection/discovery, signal acquisition (reception), channel estimation, and determining CSI. Examples of such techniques are described in PCT patent application serial number PCT/US2012/64712, filed on Nov. 12, 2012, and incorporated by reference in its entirety herein. In the examples herein, therefore, wireless communication devices detect/discover other wireless communication devices in their vicinity by transmitting and receiving D2D SRS signals.

As discussed above, when one wireless communication device is aware of another wireless communication device and intends to communicate with the other wireless communication device, it may be more efficient to communicate through a D2D communication link instead of through the network. In order to avoid interference, the communication resources used for the D2D communication link 101 must be assigned or scheduled. Although it may be possible for the wireless communication devices to track and assign communication resources autonomously, a more centralized controller within the network can more easily manage the scheduling, reducing processing at the wireless communication devices.

Referring now to FIG. 1B, the communication system 100 utilizes downlink communication resources 128 for downlink communication from a base station to wireless communication user equipment (UE) devices and utilizes uplink communication resources 130 for uplink transmissions from the UE devices to the base station. The uplink communication resources are different from the downlink communication resources. Depending on the particular implementation, some of the downlink communication resources 128, some of the uplink communication resources 130, or some of both are assigned for device-to-device (D2D) transmission from UE devices as needed. Accordingly, the D2D signals 124, 126 may use downlink communication resources 128 or uplink communication resources 130 assigned by the scheduler 112. The communication resources 122 assigned for D2D communication are not used for downlink communication. For example, if the communication resources are time-frequency communication resources, the time segments and frequency bands assigned for D2D transmission are not used by the base station to serve non-D2D UE devices. If uplink communication resources are assigned for D2D communication, the scheduling of those resources to other devices is managed to minimize interference.

The UE devices transmit the D2D signals 124, 126 using the assigned communication resources 122. As discussed herein, defined downlink communication resources are communication resources defined by a communication specification as the communication resources reserved for downlink communication from a base station to wireless communication devices. Scheduled downlink communication resources are a subset of the defined downlink communication resources that have been assigned (scheduled) for downlink communication between a base station and a wireless communication device, and D2D communication resources 122 are a subset of the defined downlink communication resources that have been assigned (scheduled) for D2D transmission from wireless communication devices if downlink communication resources are used for D2D communication.

Also as discussed herein, defined uplink communication resources are communication resources defined by a communication specification as the communication resources reserved for uplink communication from a wireless communication devices to base stations. Scheduled uplink communication resources are a subset of the defined uplink communication resources that have been assigned (scheduled) for uplink communication between a wireless communication device and a base station, and D2D communication resources 122 are a subset of the defined uplink communication resources that have been assigned (scheduled) for D2D transmission from wireless communication devices if uplink resources are used for D2D communication. Therefore, the defined macrocell communication resources 121 include defined macrocell downlink communication resources 128 and defined macrocell uplink communication resources 130 where a subset of one or both of the defined resources are assigned for D2D communication.

The communication network manages D2D communication links by receiving and transmitting information over macrocell communication resources. In accordance with the examples discussed herein, wireless communication devices transmit D2D link information 132 to base stations using macrocell uplink communication resources and base stations transmit D2D link establishment messages 134 to the wireless communication devices using macrocell downlink communication resources. A D2D call/session can be initiated by a wireless communication device by sending a D2D call initiation message 136 using macrocell uplink communication resources. The D2D call initiation message can further include a D2D call type indicator indicating whether the establishment of the D2D communication link is for a Voice over Internet Protocol (VoIP) call or for a transfer of data. If the D2D call type indicator indicates the transfer of data, the D2D call initiation message further includes a D2D Buffer Status Report (BSR) indicating a volume of data to be transmitted over the D2D communication link.

In one scenario, the first wireless communication device 104 transmits a call/session initiation message 136 to the base station 102. As discussed in further detail below, the first wireless communication device, in response to the base station, transmits D2D link information 132 to the base station. The D2D link information 132 may include any parameter or indicator that provides the base station information regarding the communication link between the first wireless communication device and the second wireless communication device. The D2D link information 132 may include parameters describing the channel quality, amount of data to be transmitted over the D2D link, transmission power and other information. For the examples herein, the D2D link information may include a D2D Buffer Status Report (BSR) indicating a volume of data to be transmitted over the D2D communication link, a D2D Power Headroom Report (PHR) indicating available transmission power for D2D transmission over the D2D communication link, and D2D Channel State Information (CSI) comprising at least one characteristic of a channel of the D2D communication link.

The base station sends D2D link establishment information 134 to at least one of the wireless communication devices. The D2D link establishment information includes information that allows the wireless communication devices to communicate over the D2D communication link and may include scheduling information for time-frequency communication resources to be used for the D2D communication link. The D2D link establishment information is transmitted to a wireless communication device using macrocell downlink communication resources. As discussed below, an example of a suitable technique for transmitting the D2D link establishment information 134 includes sending the information over a physical downlink control channel (PDCCH). Such a PDCCH is similar to a conventional PDCCH transmission assigning communication resources for macrocell communication except that the identified communication resources are assigned for D2D communication instead of conventional macrocell communication.

For the examples, therefore, scheduler 112 in the controller 108 allocates D2D time-frequency resources 122 to the wireless communication devices 104, 106 by providing the D2D link establishment information 134. The information 134 is transmitted by the base station using the PDCCH although the information may be transmitted using any number of control signals, and/or messages.

For the example of FIG. 1B, D2D link information 132 is transmitted by both wireless communication devices and D2D link establishment information is transmitted by the base station 102 to both devices. As mentioned above, however, the D2D link information may be transmitted by only one of the devices in some circumstances. Also, the link establishment information may be transmitted by the base station to only one of the devices.

Figure 2:
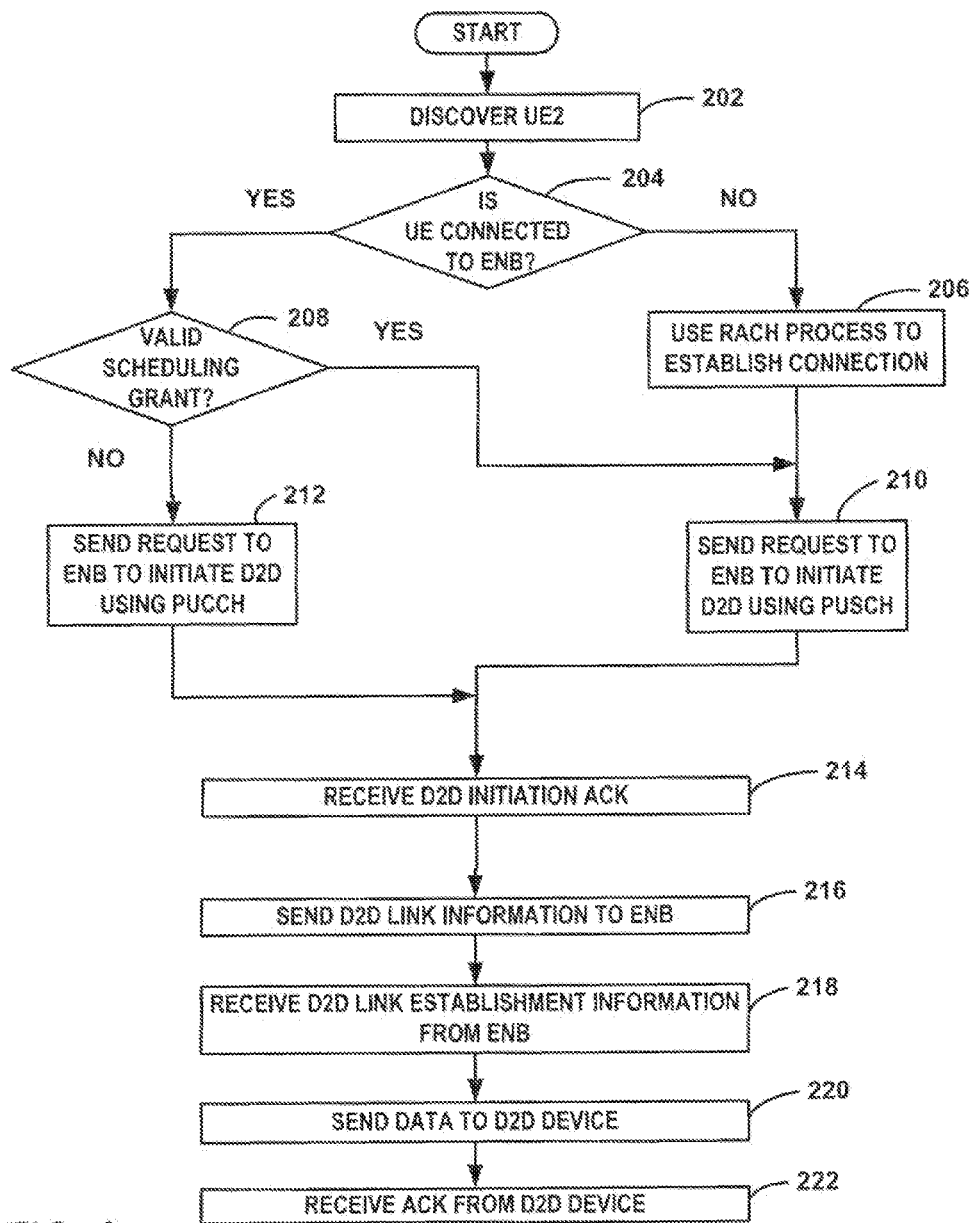
FIG. 2 is a flowchart of an example of a method of managing D2D communication using macrocell communication resources.

FIG. 2 is a flowchart of an example of a method of managing D2D communication using macrocell communication resources. The method is performed in a wireless communication device (UE) such as the first wireless communication device 104.

At step 202, another wireless communication device is discovered. For the examples discussed herein, each wireless communication device periodically transmits reference signals that are used by other wireless communication devices to detect and identify the wireless communication device. An example of a suitable technique is discussed in the above-referenced patent PCT application serial number PCT/US2012/64712. Accordingly, the first wireless communication device receives a reference signal from the second wireless communication device, identifies the second wireless communication device, and determines that a D2D link between first and second wireless communication devices should be established.

At step 204, it is determined whether the first wireless communication is connected to the base station. The wireless communication device determines if it is engaged in active data session (data communication or voice call) through the base station. If it is connected, the method continues at step 208. If it is not connected, the wireless communication device uses the random access channel (RACH) process at step 206 to establish a connection and initiate a D2D call. The wireless communication device initiates connection with the base station by transmitting a random access channel (RACH) request. A RA response is transmitted by the base station and received by the wireless communication device. For the examples herein, the RACH process is performed in accordance with known techniques. The RACH request and response establishes an uplink channel to the base station. For the examples herein, the uplink channel is maintained while the wireless communication device engages in D2D communication. After the RACH process is completed, the method proceeds to step 210 where the wireless communication device sends a request to initiate D2D communication. A D2D call initiation message 136 is transmitted to the base station indicating that wireless communication device is initiating a D2D call with the second wireless communication device.

At step 208, it is determined whether the wireless communication device has been assigned a valid scheduling grant by the base station. The wireless communication device determines if uplink shared channel resources have been granted. If the wireless communication device has been assigned communication resources for transmission to the base station, the method continues at step 210. Otherwise, the method proceeds to step 212.

At step 210, the wireless communication device sends a request to the base station to initiate a D2D communication session using assigned resources. The first wireless communication device transmits D2D call initiation message using uplink shared channel (UL-SCH) transport layer over the Physical Uplink Shared Channel (PUSCH). For the examples herein, the D2D call initiation message 136 is time multiplexed with the coded UL-SCH data and delivered to the base station over the PUSCH.

At step 212, the wireless communication device sends a request to the base station to initiate a D2D communication session over the Physical Uplink Control Channel (PUCCH). The first wireless communication device transmits D2D call initiation message 136 using PUCCH.

At step 214, an acknowledgment is received from the base station (eNB) indicating that the second wireless communication device (UE2) has been paged and that the D2D processes has been initiated.

At step 216, the wireless communication device sends the D2D link information to the base station. In response to the base station response, the first wireless communication device transmits the D2D link information which may include a D2D Buffer Status Report (BSR) indicating a volume of data to be transmitted over the D2D communication link, a D2D Power Headroom Report (PHR) indicating available transmission power for D2D transmission over the D2D communication link, and D2D Channel State Information (CSI) comprising at least one characteristic of a channel of the D2D communication link. In some situations where a D2D voice call is being initiated, the BSR may be omitted. The D2D link information in these situations may also include an indicator indicating that the D2D call is a voice call. The channel characteristics for the D2D link information is typically maintained by the wireless communication device by evaluating the periodically transmitted reference signals by the second wireless communication device. The D2D link information is transmitted to the base station using macrocell uplink communication resources. For the examples, the D2D link information is transmitted with the macrocell CSI information for the macrocell communication link between the base station and the first wireless communication device 104. Transmission of the D2D link information is similar to transmission of BSR, CSI, and PHR in conventional macrocell communication. The transmission of the D2D link information, however, also includes an indication that the information is related to a D2D communication link. Accordingly, the D2D link information may be transmitted on a PUSCH or PUCCH along with macrocell link information. For the examples herein, the wireless communication device maintains a macrocell connection while engaging in D2D communication and provides channel characteristics of the macrocell channel as well D2D link information.

At step 218, D2D link establishment information is received from the base station. The link establishment information is transmitted over the Physical Downlink Control Channel (PDCCH) in the examples. Accordingly, the link establishment information is received by the wireless communication device using macrocell downlink communication resources. The D2D link establishment information provides information that allows the wireless communication devices to communicate over a D2D communication link. In the examples, the D2D link establishment information identifies the subset of defined macrocell communication resources that are to be used for transmission of D2D signals from the first wireless communication device to the second wireless communication device. In addition, the D2D link establishment information includes Transport Format Selection and Power Control commands for D2D transmission. In some circumstances, the first wireless communication device may also receive D2D link establishment information related to transmission from the second wireless communication device.

At step 220, the first wireless communication device sends D2D data to the second wireless communication device over the D2D communication link. Using the parameters provided in the D2D link establishment information, the first wireless communication device transmits the D2D data to the second wireless communication device.

At step 222, first wireless communication device receives an acknowledgment (ACK) from the second wireless communication device that the D2D data was received.

Figure 3:
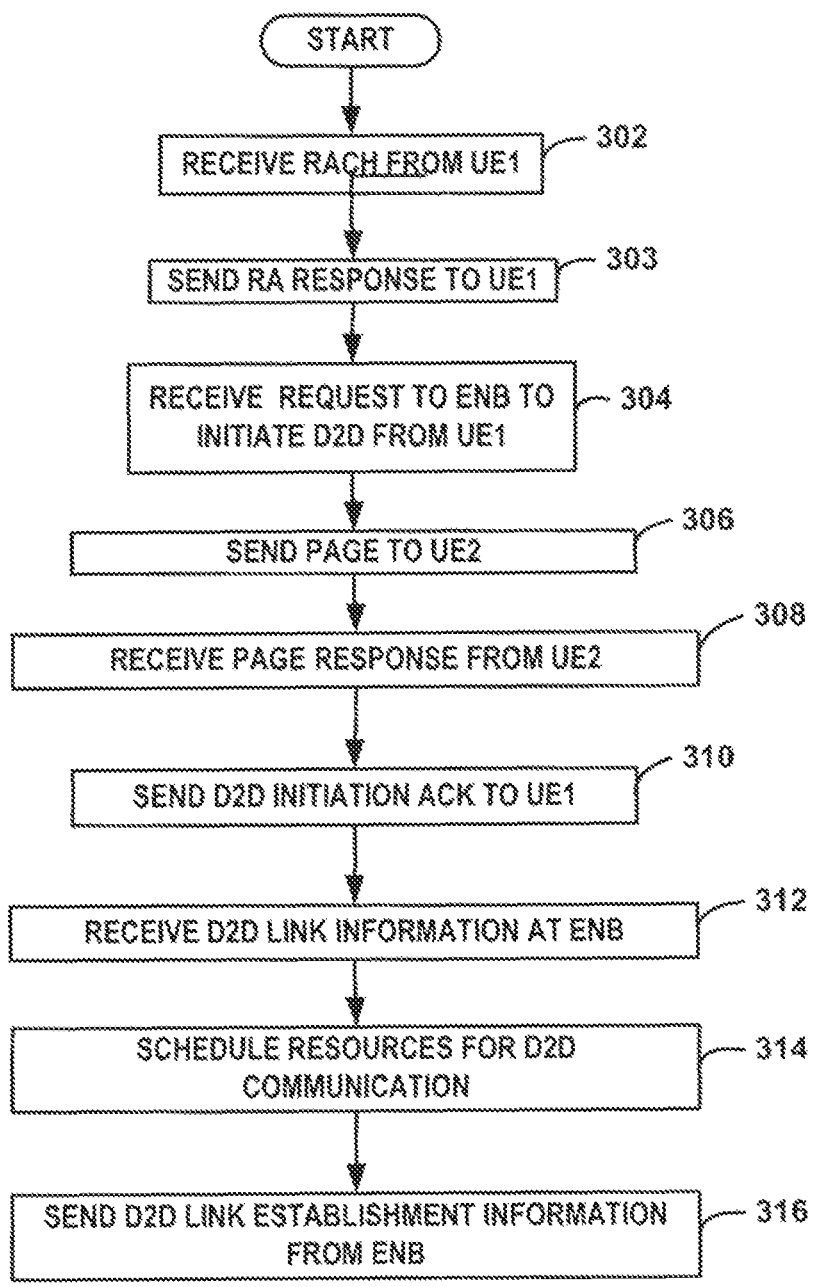
FIG. 3 is a flowchart of an example of a method of managing D2D communication performed in a core network.

FIG. 3 is a flowchart of a method of managing D2D communication performed in a core network. The method may be performed by any combination of hardware and code within the core network. Some or all of the steps may be performed autonomously by the base station, by the controller, or another entity in the core network while some or all of the functions may be performed by collaboration by multiple entities in the network. In the example of FIG. 3, the first wireless communication device is not registered to the base station at the time that a D2D call is initiated.

At step 302, a RACH is received from the first wireless communication device. For the examples herein, the RACH is formatted and transmitted in accordance with conventional techniques.

At step 303, a RA response message is sent to the first wireless communication device. The base station sends the RA response message on the Physical Downlink Control Channel (PDCCH). The RA response message typically conveys at least an RA-preamble identifier, timing alignment information, initial UL grant, and assignment of temporary C-RNT.

At step 304, a request to initiate a D2D call is received from the first wireless communication device. A D2D call initiation message is received from the first wireless communication device where the D2D call initiation message indicates that the first wireless communication device is initiating a D2D call with the second wireless communication device. The D2D call initiation message, therefore, identifies the second wireless communication device in the example.

At step 306, a page is sent to the second wireless communication device. The base station transmits a paging message in accordance with known techniques. For the examples herein, however the page indicates that the page is for D2D call in addition to identifying the first wireless communication device.

At step 308, a paging response is received from the second wireless communication device. The UE acknowledges the page by sending an ACK in accordance with known techniques.

At step 310, a D2D initiation ACK is sent to the first wireless communication device. For the example, the base station sends the ACK on the Physical Downlink Control Channel (PDCCH).

At step 312, D2D link information is received from the first wireless communication device. As described above, D2D link information may include a D2D Buffer Status Report (BSR) indicating a volume of data to be transmitted over the D2D communication link, a D2D Power Headroom Report (PHR) indicating available transmission power for D2D transmission over the D2D communication link, and D2D Channel State Information (CSI) comprising at least one characteristic of a channel of the D2D communication link. The D2D link information is received on a macrocell uplink communication resource such as a PUCCH and PUSCH.

At step, 314 D2D communication resources are scheduled. Based on the D2D link information and possibly other factors, the scheduler determines the appropriate defined macrocell communication resources to use for D2D communication and assigns those D2D communication resources for D2D communication at step 314.

At step 316, D2D link establishment information is sent. The base station sends D2D link establishment information to the first wireless communication device over macrocell communication resources. As discussed above, the information is sent on the PDCCH in the examples.

Figure 4:
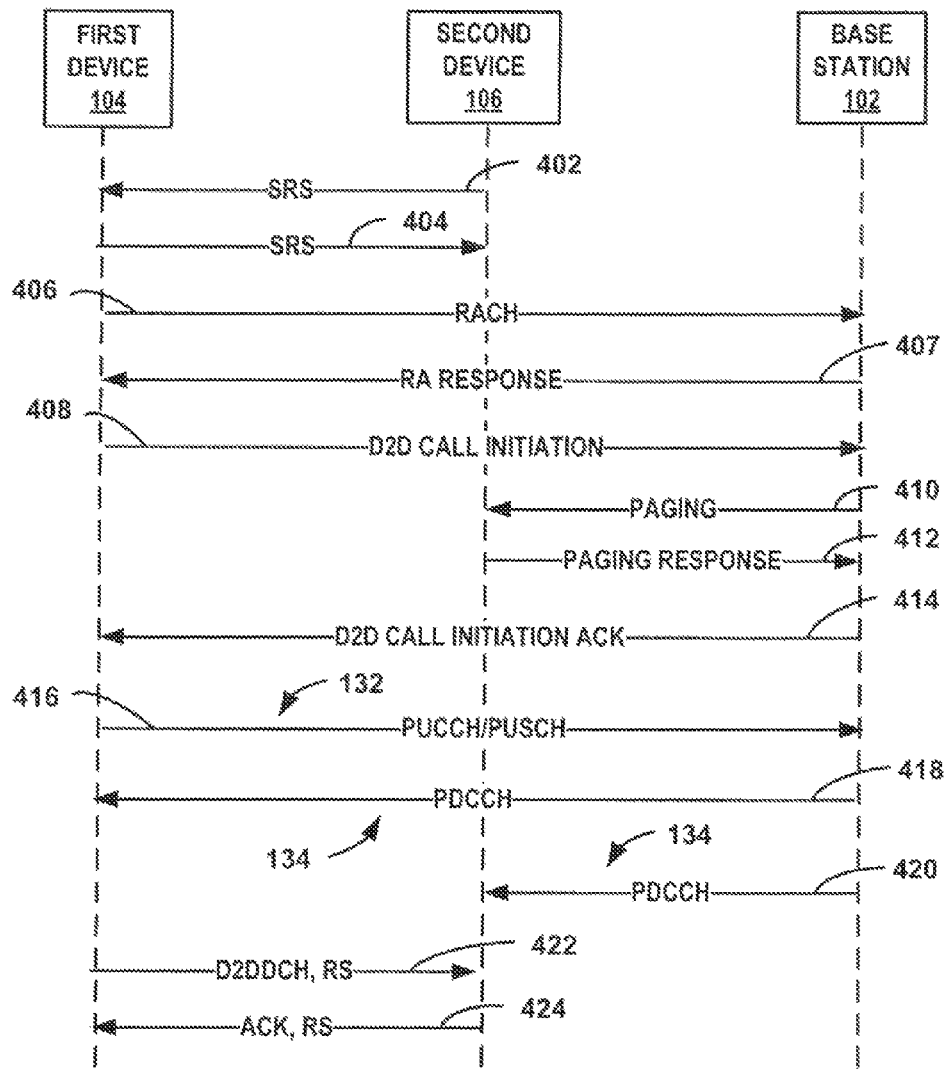
FIG. 4 is a messaging timing diagram for an example of managing establishment of a D2D communication link.

FIG. 4 is a messaging timing diagram for an example of managing establishment of a D2D communication link 101. The events and transmissions in FIG. 4 may be implemented in various ways depending on the particular system and communication specification.

At event 402, a reference signal is transmitted from the second wireless communication device. A reference signal is transmitted from the first wireless communication device at event 404. For the examples, the reference signals are sounding reference signals (SRS) that are periodically transmitted by the wireless communication devices.

In conventional systems, wireless communication devices transmit sounding reference signals (SRS) to the base station to allow the base station to evaluate the uplink channels. Reference signals also enable discovery, acquisition, demodulation, and time alignment. For example, downlink reference signals transmitted by base stations are used by the UE devices to detect (discover) nearby base stations. Evaluation of the reference signals also provides channel estimation, allowing the wireless communication device to acquire and receive downlink signals transmitted by the base station. Time delays can be determined by observing the timing of the received reference signal to a transmission time of the signal.

As described in further detail in the referenced PCT patent application serial number PCT/US2012/64712, SRS signals are also used for channel estimation and device detection between D2D devices. For the examples described herein, D2D sounding reference signals (SRS) are transmitted between UE devices that are communicating, or that may communicate, over a device-to-device (D2D) communication link. A base station transmits control Information to the UE devices identifying the macrocell communication resources that should be used for D2D SRS transmissions. The D2D SRS signals can be used for channel estimation, determining Channel State Information, device discovery, signal acquisition, and time alignment. The D2D SRS transmissions can also assist in demodulation of associated data symbols.

As discussed below in further detail, a wireless communication UE device determines channel state information (CSI) based on D2D SRS transmissions sent by another UE device and reports the CSI to a base station. Based on the reported CSI, a scheduler, controller, and/or base station schedules device-to-device (D2D) communication by assigning macrocell communication resources to the wireless communication (UE) devices.

At event 402 and 404, therefore, each wireless communication device receives the SRS signal transmitted by the other wireless communication device to detect and identify the other device. At event 406, the first wireless communication device transmits a RACH to the base station to connect to or reconnect to the network. The base station transmits an RA response to the first wireless communication device at event 407. The first wireless communication device transmits a D2D call initiation message at event 408. The D2D call initiation message can be sent simultaneously with the RACH in some situations. In response to receiving the D2D call initiation message, the base station sends a paging message to the second wireless communication device at event 410. The second wireless communication device response to the paging message with a paging response at event 412. The base station transmits a D2D initiation ACK to the first wireless communication device at event 414. The D2D initiation ACK at least indicates that the second wireless communication has been paged. The ACK may also indicate that the second wireless communication device has acknowledged the page. In some circumstances, the D2D initiation ACK may indicate that D2D communication has been authorized by the base station/core network. In other implementations, the D2D initiation ACK may be sent at other times. For example, the ACK may be sent before the second wireless communication device is paged. In other examples, the ACV may be sent after the second wireless communication device is paged but before the second wireless communication device responds to the page.

At event 416, the first wireless communication device transmits the D2D communication link information 132 to the base station. As discussed above, the D2D communication link information may be sent over the PUCCH or the PUSCH. The base station receives the D2D communication link information and forwards it to the scheduler in the controller. Based on the information, the controller determines the appropriate defined macrocell communication resources to be used for the D2D communication link. At event 418, D2D link establishment information 134 is sent to the first wireless communication device. The D2D link establishment information indicates the communication resources that the first wireless communication device will use to transmit D2D signals to the second wireless communication device. At event 420, the base station transmits the D2D link establishment information 134 to the second wireless communication device. The D2D link establishment information sent to the second wireless communication device indicates the D2D communication resources that will be used by the first wireless communication device to transmit the data to the second wireless indication device. The D2D link establishment information sent to each wireless communication device may also include other parameters or information. For example, communication resources for transmitting acknowledgment messages from the second wireless communication device to the first wireless communication device may also be included. Other information may include transmission power level. In some situations, the D2D link establishment information may be sent to one of the wireless communication devices which then relays the information to the other wireless communication device over the D2D link. At event 422, the first wireless communication device transmits data to the second wireless communication device over the D2D communication link. In addition, the first wireless communication device may transmit a reference signal. The data is transmitted over a D2D data channel (D2DDCH). An example of a suitable technique for transmitting D2D signals is discussed in the referenced PCT Patent Application Serial Number PCT/US2012/064711. At event 424, the second wireless communication device transmits an acknowledgment (ACK) message to the first wireless communication device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method of establishing a device-to-device (D2D) communication link between a first wireless communication device and a second wireless communication device, the method comprising:

receiving, at a base station from the first wireless communication device, a D2D call initiation message over an uplink macrocell communication resource defined by a communication specification for uplink transmission from wireless communication devices to base stations in a macrocell communication system, the D2D call initiation message comprising a device identifier of the second wireless communication device; and transmitting a D2D link establishment message from the base station to the second wireless communication device over a downlink macrocell communication resource defined by the communication specification for downlink transmission from base stations to wireless communication devices in the macrocell communication system, the D2D link establishment message comprising information for establishing a D2D communication link between the first wireless communication device and the second wireless communication device, wherein the transmitting comprises, in response to receiving the D2D call initiation message, transmitting a paging message to the second wireless communication device indicating to the second wireless communication device that the first wireless communication device is establishing the D2D communication link with the second wireless communication device.

2. The method of claim 1, wherein the transmitting the paging message comprises transmitting the paging message over a paging channel also used for transmitting cellular paging messages to establish cellular communication links between the base station and the second wireless communication device.

3. The method of claim 1, wherein the D2D link establishment message comprises:
   D2D resource information identifying D2D communication resources for transmission of data between the first wireless communication device and the second wireless communication device, the D2D communication resources selected from macrocell communication resources defined by the communication specification for communication between base stations and wireless communication devices in the macrocell communication system.

4. The method of claim 3, further comprising transmitting, to the first wireless communication device, another D2D link establishment message comprising the D2D resource information.

5. The method of claim 4, wherein:
   transmitting the D2D link establishment message comprises transmitting the D2D resource information over a Physical Downlink Control Channel (PDCCH) defined by the communication specification for control signal transmission from base stations to wireless communication devices; and
   transmitting another D2D link establishment message comprises transmitting the D2D resource information over the Physical Downlink Control Channel (PDCCH) to the first wireless communication device.

6. The method of claim 1, further comprising receiving, from the first wireless communication device, a D2D Buffer Status Report (BSR) indicating a volume of data to be transmitted over the D2D communication link.

7. The method of claim 1, further comprising receiving, from the first wireless communication device, a D2D Power Headroom Report (PHR) indicating available transmission power for D2D transmission over the D2D communication link.

8. The method of claim 1, further comprising receiving, from the first wireless communication device, D2D Channel State Information (CSI) comprising at least one characteristic of a channel of the D2D communication link.

9. The method of claim 1, wherein the D2D call initiation message further comprises:
   a D2D call type indicator indicating whether the establishment of the D2D communication link is for a Voice over Internet Protocol (VoIP) call or for a transfer of data.

10. The method of claim 9, wherein, if the D2D call type indicator indicates the transfer of data, the D2D call initiation message further comprises a D2D Buffer Status Report (BSR) indicating a volume of data to be transmitted over the D2D communication link.

11. A method of establishing a device-to-device (D2D) communication link between a first wireless communication device and a second wireless communication device, the method comprising:
   transmitting, to a base station from the first wireless communication device, a D2D call initiation message over an uplink macrocell communication resource defined by a communication specification for uplink transmission from wireless communication devices to base stations in a macrocell communication system, the D2D call initiation message comprising a device identifier of the second wireless communication device; and
   receiving a D2D link establishment message from the base station at the second wireless communication device over a downlink macrocell communication resource defined by the communication specification for downlink transmission from base stations to wireless communication devices in the macrocell communication system, the D2D link establishment message comprising information for establishing a D2D communication link between the first wireless communication device and the second wireless communication device, wherein the receiving comprises receiving a paging message, which was transmitted by the base station in response to receiving the D2D call initiation message, from the base station indicating to the second wireless communication device that the first wireless communication device is establishing the D2D communication link with the second wireless communication device.

12. The method of claim 11, wherein the D2D link establishment message comprises:
   D2D resource information identifying D2D communication resources for transmission of data between the first wireless communication device and the second wireless communication device, the D2D communication resources selected from macrocell communication resources defined by the communication specification for communication between base stations and wireless communication devices in the macrocell communication system.

13. The method of claim 12, wherein receiving the D2D link establishment message comprises receiving the D2D resource information over a Physical Downlink Control Channel (PDCCH) defined by the communication specification for control signal transmission from base stations to wireless communication devices.

14. The method of claim 11, further comprising transmitting, from the first wireless communication device, a D2D Buffer Status Report (BSR) indicating a volume of data to be transmitted over the D2D communication link.

15. The method of claim 11, further comprising transmitting, from the first wireless communication device, a D2D Power Headroom Report (PHR) indicating available transmission power for D2D transmission over the D2D communication link.

16. The method of claim 11, further comprising transmitting, from the first wireless communication device, D2D Channel State Information (CSI) comprising at least one characteristic of a channel of the D2D communication link.

17. The method of claim 11, wherein the D2D call initiation message further comprises:
   a D2D call type indicator indicating whether the establishment of the D2D communication link is for a Voice over Internet Protocol (VoIP) call or for a transfer of data.

18. The method of claim 17, wherein, if the D2D call type indicator indicates the transfer of data, the D2D call initiation message further comprises a D2D Buffer Status Report (BSR) indicating a volume of data to be transmitted over the D2D communication link.

* * * * *